United States Patent [19]
Rubin

[11] 3,935,654
[45] Feb. 3, 1976

[54] ILLUMINATED VEHICULAR DISPLAY SIGN

[75] Inventor: Irene E. Rubin, Houston, Tex.
[73] Assignee: Irene E. Rubin, Houston, Tex.
[22] Filed: Sept. 19, 1974
[21] Appl. No.: 507,341

Related U.S. Application Data
[63] Continuation of Ser. No. 290,434, Sept. 20, 1972, abandoned.

[52] U.S. Cl. ............................................. 40/129 C
[51] Int. Cl.² ......................................... G09F 7/00
[58] Field of Search.. 40/132 R, 133 R, 204, 130 R, 40/152.2

[56] References Cited
UNITED STATES PATENTS

| | | | |
|---|---|---|---|
| 1,390,561 | 9/1921 | Kelly | 40/129 C |
| 1,525,021 | 2/1925 | Benzenberg | 40/132 R |
| 1,827,963 | 10/1931 | Wompey | 40/132 R |
| 1,856,519 | 5/1932 | Spears | 40/132 R |

Primary Examiner—Robert Peshock
Assistant Examiner—Wenceslao J. Contreras
Attorney, Agent, or Firm—Roy Hammond Smith, Jr., Esq.

[57] ABSTRACT

An illuminated sign panel adapted for mounting on the sides of vehicles such as trucks and having removable and replaceable sign display areas in the form of sheets of transparent or translucent materials. A sign display area may be composed of one sheet or several. The illumination is indirect and is designed to be supplied from behind the sign display area. The display panel is rigidly and fixedly mounted on the vehicle which can be an automobile, panel truck or truck trailer, for example.

7 Claims, 5 Drawing Figures

U.S. Patent  February 3, 1976  3,935,654
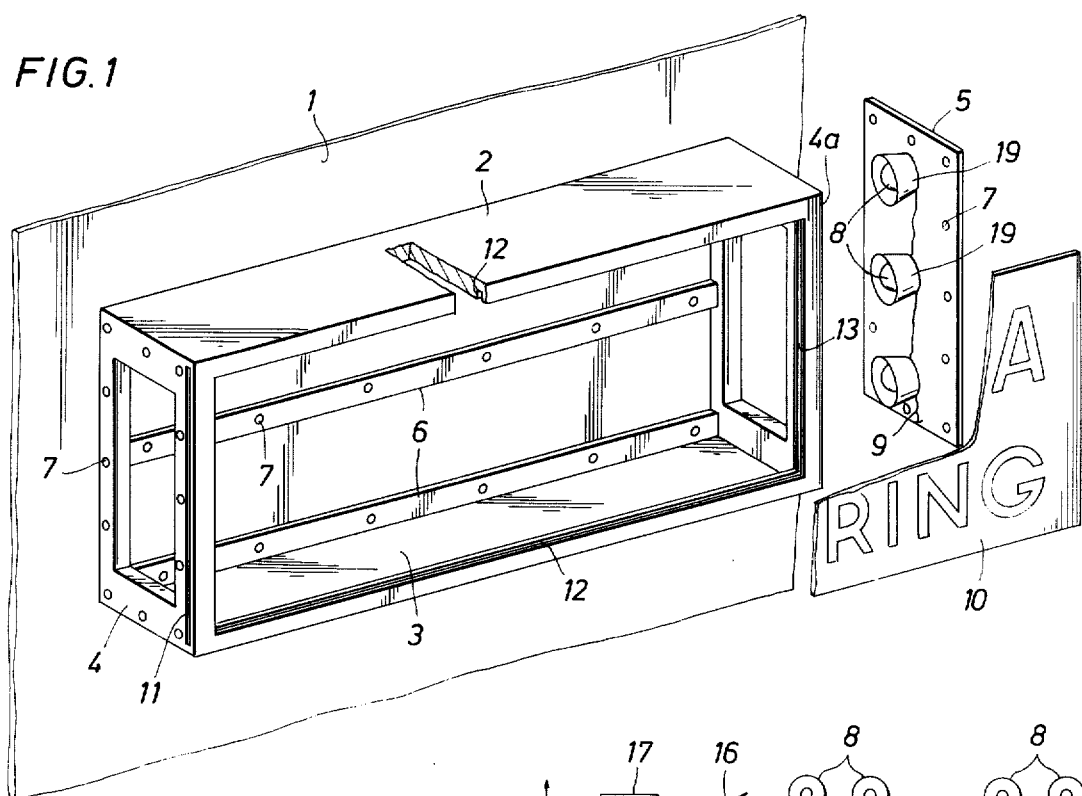
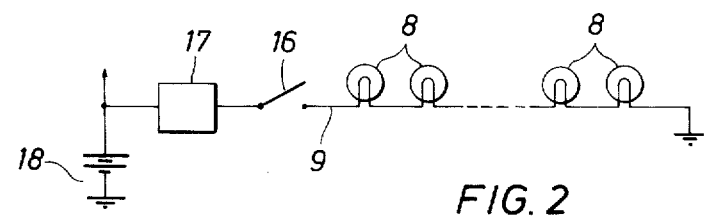
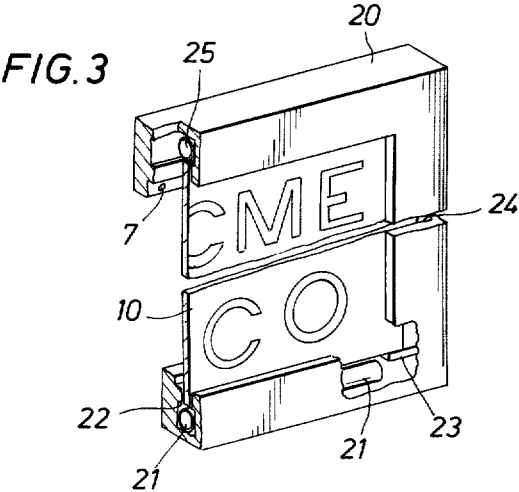
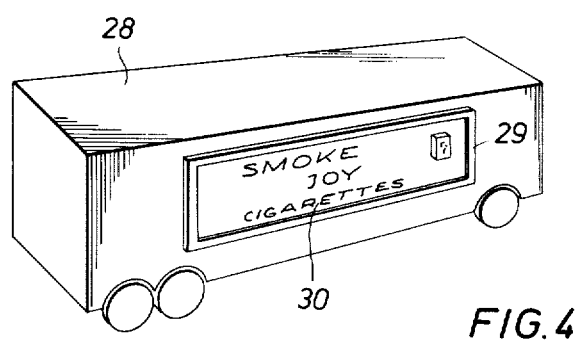
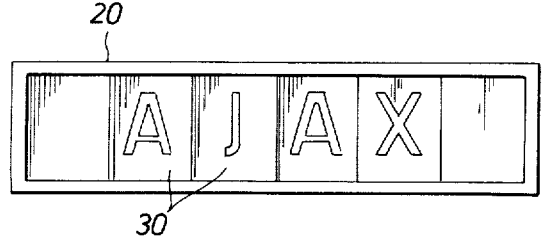

ILLUMINATED VEHICULAR DISPLAY SIGN

RELATED APPLICATIONS

The present application is a continuation of a co-pending application of the same inventor, Ser. No. 290,434, filed Sept. 20, 1972, now abandoned.

BACKGROUND OF THE INVENTION

The present invention relates to an illuninated display panel suitable for attachment on a truck or automobile. More particularly, the invention relates to lighted display panels having replaceable display areas.

The use of lighted signs is widespread. Lighted signs of every size and concept of imagination are located on buildings and stores and line highways and roads. The ordinary billboard, so long a fixture along the highways, may soon be extinct because of federal, state and local laws and regulations which will require the removal of those now in use and prohibit any substantial number of new signs. Notwithstanding these new laws, advertising has been and will continue to be an important aspect of a free competitive system.

The objection to billboards and signs along the highways is not directed toward the content but is an aesthetic matter, since it is considered by many that the billboards spoil the view of the countryside otherwise available from the highways. There are on these same highways numerous trucks and trailers whose sides are for the most part barren. These truck panels offer the space for advertising that will no longer be available along the side of the road. This usage will provide national and regional advertisers some of the product exposure they need to compete.

However, merely attaching signs onto the sides of trucks is not a satisfactory approach, nor a satisfactory substitute for roadside billboards, since the signs must be readily and quickly removed, for unlike the roadside billboards, the signs on the truck will of necessity have to be changed so as not to interfere with the principal commercial usage of the trucks.

Another aspect of the proposed vehicular billboard usage is the area over which a particular advertisement is to be carried. It may be desirable to retain a particular sign on a designated stretch of highway or in a particular region. Thus, the sign should not only be rapidly and readily removable, but it should also be in reusable condition when removed so that it may be transferred to other display panels.

The display panels on the vehicles should also be visible. During the daylight hours there is no problem. However, at night on the open highways, there would be little benefit from the signs displayed unless there was a light source. This problem is handled on fixed location signs in present use by flood lights, spotlights or lighted signs such as those commonly called "neon signs."

It can be appreciated then that vehicle signs or display panels should be quickly and easily changed, should be lighted, and the sign or advertisement should be of relatively permanent or reusable character.

Another phenomenon which is rapidly occurring is the expanded use of leased or rented trucks, trailers, and other business vehicles. If the lease is of a substantially long duration, it may be expedient to have a sign permanently attached to the side of the vehicle giving the user's trade name, address, telephone numbers and the like. However, on short term rentals this would not be economically feasible. Similarly, in a multidivisional organization it may be desirable to change the lettering or message on a vehicle relative to the division employing it.

Notwithstanding whether a vehicle is leased or owned, any advertising, lettering or a message on the display area is often there for commercial purposes. Thus, it would be of benefit to have the sign or panel visible at night as well as during the day.

The present invention seeks to provide the means for providing each of the desirable elements for illuminated vehicle display panels set out above, e.g., rapid and easy changeability of the displayed material, which is reusable.

The prior art has at times attempted to employ display arrangements for use on vehicles which would achieve that which the present invention achieves.

An illuminated sign suitable for use on the radiators of vehicles was disclosed in U.S. Pat. No. 1,390,561 issued to Kelly. The location of the sign on the radiator would partially block the flow of air to the heat exchange tubes of the radiator, causing over-heating. Similarly, the location of the sign on the radiator may cause unnecessary over-heating of the sign and a corresponding accelerated degeneration of the components of the sign. Moreover, the sign placed in the designated location on the radiator is also subject to being grime-covered and being struck by debris and rocks from the road. Furthermore, the Kelly sign was designed to be suspended over the radiator by straps circling about portions of the radiator. The placement of the means to illuminate the sign was such that the harsh direct light from the incandescent bulbs was directly on the glass panel of the sign. This arrangement did not provide an attractive, easily read sign. Access to the interior of the sign is acquired by sliding the glass panel to the side. The glass panel can also be removed in this manner.

Another U.S. Pat. No. 1,894,857 to Dwyer et al., shows an illuminated sign for attachment to the side panels of a radiator hood. The front plate of the sign is situated in a hinged frame to facilitate access to the interior of the sign for service. The light bulbs are exposed directly to the interior of the front plate, which gives a glaring effect. Strangely, Dwyer et al. have provided two short plates on the top and bottom of the bulb which will tend to prevent diffusion of the light over the height of their sign while the glare is directed primarily to the area of the sign immediately adjacent to the bulb. Another feature found in the Dwyer et al. sign is a partition which is supposed to cause some reflection and dispersion of the light. However, should one of the two bulbs at either end of the sign burn out or otherwise not operate, this partition will effectively prevent any of the light from the lone remaining bulb from reaching the portion of the sign adjacent to the non-functioning bulb.

A particular deficiency of numerous prior art signs was the dependence placed on one or often only two light sources. This can be seen in both the Kelly and Dwyer patents as well as, for example, in U.S. Pat. No. 1,396,245 to Boettcher and 1,827,963 to Wompey. Neither of these latter signs relates to vehicular mounted signs. However, they disclose the feature of internal illumination.

SUMMARY OF THE INVENTION

The purpose of the present invention is to provide an illuminated display panel in which the display area is a transparent or, more preferably, a translucent sheet material. The display panel is rigidly attached to a vehicle such as a panel truck, automobile, tractor trailer or the like. The display panel can be attached on the door or in the case of trucks on the side portion of the container area.

The attachment can be characterized as permanent; for example, by welding or by means of bolts, rivets or the like, so long as the display panel is rigidly attached to the vehicle. The display area which is sheet material is made easily removable and replaceable by sliding the sheet material through a slot in one side of the display panel and along grooves or channels in the top and bottom of the front portion of the display panel. The display area can be composed of a single piece of sheet material or may be composed of two or more sections dividing the display area vertically. This is a particularly useful aspect in the case of large billboard type signs.

Small display areas such as those on panel delivery trucks will normally be composed of a single piece of sheet material. It should be noted that even in the small sized signs, the display area can be divided into two or more sections. This aspect of the invention allows the insertion of individual letters, groups of letters, or combination of letters and other indicia into the display area.

The illumination of the sign is achieved by indirect light on the back side of the display area. This can be achieved by arranging a grouping of incandescent light bulbs along at least two of the edges of the sheet material. The bulbs are provided with reflectors and are directed along the axis of the display panel or toward one of the sides of the display panel other than the display area.

In another embodiment of the present invention, the illumination is provided from a light source located within the two grooves or channels into which the display area sheet material is placed. This light source can be either incandescent, such as a number of individual bulbs, or a single or several elongated type bulbs. Gas discharge type bulbs, such as fluorescent lamps, can also be employed.

In addition to providing light from two edges of the display area, light can also be supplied from the other sides. In regard to the larger billboard type signs, it may be desirable to provide for such additional light sources.

The sheet material used as the display area can be either transparent or translucent. The material displayed can be either achieved by applying an opaque material to block out that which is being displayed as a silhouette, or the light may be allowed to pass through the displayed material by blocking out the remainder of the display area. The material employed in the sheet material can be glass, plastic, such as fiber glass, polymethylmethacylates, or the like.

The sheet material can have such conventional refinements as prismatic inner surfaces in order to further reflect and diffuse the light, such as by ridges or pyramidal forms. The indicia being displayed can be applied to the inner or outer surface of the sheet material or may be cut or impressed into the surface so as to provide an additional degree of refraction.

The present vehicle sign is distinguished from those in use today in that it is lighted. The lighting as heretofore described is internal and indirect. The source of power for the lights is principally intended to be the regular electrical power generating system of the particular vehicle associated with the sign, i.e., battery, generator or alternator, or combinations thereof. It should be appreciated, however, that in the case of large billboard type signs, the ordinary factory equipment on the vehicle may be inadequate. Thus, the present invention envisions heavy duty batteries, generators and alternators and electrical power supply systems which are completely independent of any power supply system otherwise employed on the vehicle.

In the case of semi-trailers, which do not necessarily have any type of power system, the use of an independent power source may be the most efficient manner to operate. The trailer is then capable of operating with any tractor regardless of whether the tractor is adapted to handle the sign's electrical requirements.

In the case of small signs used to carry the name of a product or company on, for example, a panel truck, it is anticipated that the electrical system on the truck will be adequate to provide power to the sign without undue strain on the system.

The lights of the present sign can be connected directly to the same switch employed for the road lamps of the vehicle so that the sign is illuminated when the road lamps are used. A greater degree of flexibility is obtainable by employing a discrete switch for the sign or signs, however.

The term "vehicle" as used herein includes, as indicated above, not only self-propelled vehicles, but also those which are pulled or pushed by a locomotion vehicle, i.e., trailers, trailer signs, etc.

Among the advantages of the present invention is the side mounting aspect of the sign such that it will remain visible from a roadside position for a period of time during the approach and departure of the vehicle to that point. This aspect of the invention will normally afford an adequate observation period in order to convey the message of the sign to the intended audience. Another feature of the present invention is the rigid mounting of the sign to the side of the vehicle. Yet another advantage of the present vehicular display panel is the use of indirect lighting to illuminate the sign, providing a more attractive and easily observed sign. Another feature of the invention is the absence of a bright distracting light that would distract other drivers or pedestrians, yet provide enough light to attract attention and convey a message. Another feature of the present invention is the use of multiple light sources which provide a greater degree of reliability for the sign. Yet another feature of the present invention is the ease of changeability of the sign portion of the display panel. A further advantage of the present invention is the use of sectioned signs, which can, in the case of larger display areas, prove far easier to handle than a single sign section. These and other advantages not specifically recited will become apparent from the figures and the following discussion.

DESCRIPTION OF THE DRAWINGS

FIG. 1 is a perspective view of a mounted display panel of one embodiment;

FIG. 2 is a schematic representation of the electrical system for the display panel of FIG. 1;

FIG. 3 is a perspective cross-section of an alternate embodiment of the present invention;

FIG. 4 is a perspective of a truck trailer having a display panel mounted thereon; and FIG. 5 is a front elevation of a display panel having a sectioned display sign.

DESCRIPTION OF THE PREFERRED EMBODIMENT

Following hereafter is a description of the invention in reference to the drawings and preferred embodiments. Where possible, the same indicia has been employed to designate the same element in the various embodiments.

FIG. 1 shows an illuminated display panel such as would be attached to the side 1 of a panel delivery truck. The display panel is shown to be a rectangular box-like structure composed of a top 2 and a bottom 3 and two sides 4 and 4a, each having an opening therein. A plate 5 is adapted to be positioned over the opening so as to allow the incandescent lamps 8 to project into the interior of the rectangular box. The plate 5 is attached to side 4 by means of screws or bolts passing through apertures 7.

The incandescent lamps 8 are each situated in a reflector 19. In this embodiment, the lamps are positioned along with the reflectors 19 to point down the long axis of the rectangular box. The reflectors 19 prevent direct glare of the incandescent lamps 8 onto the surface of a sign area 10. The sign area 10, which is a sheet material, is placed into grooves 12 by means of slot 11 shown in side 4. The slot 11 is cooperatively positioned so that the sheet material 10 sliding through the slot engages into grooves 12 located at the front of bottom 3 and the front of top 2. The sheet material 10 slides in through slot 11 and along grooves 12 until it is seated in slot 13 on side 4a.

Sides 4 and 4a are substantial duplicates except that side 4 contains the slot 11 running totally through side 4, whereas the slot 13 need not pass through side 4a, although it may. The attachment of plate 5 to sides 4 and 4a will allow the outer edge of plate 5 to cover slot 11 (and slot 13 if it passes through side 4a) to prevent inadvertent movement of sheet material 10. As shown in FIG. 1, a message or other material can be placed onto sheet material 10.

The rectangular box which comprises the illuminated display panel has at its back side two ribs which are used to attach the display panel to the side of the vehicle by means of bolts or screws through apertures 7.

Although not shown, there is a duplicate plate 5 containing reflectors 19 with incandescent bulbs therein which is adapted to fit over side 4, in the same manner as described previously for side 4a. The incandescent lamps 8 are connected by electrical wire 9. Referring now to FIG. 2 which is a schematic of the electrical system, it is seen that the lamps 8 are connected to a power source 18 through line 9 which has disposed therein a switch 16 and a regulator 17. The purpose of the regulator is to allow the operator of the vehicle-mounted sign to adjust the intensity of the lamps.

In FIG. 3 a second or alternate embodiment of the present invention is depicted. The illuminated vehicle display panel in FIG. 3 is composed of a frame 20 which is attached to a vehicular wall by bolts or screws through holes 7 on frame 20. The sheet material 10 on which a sign or message is expressed is held in a groove 22 in the same manner as the sheet material in FIG. 1. Entrance into the groove is achieved in the same manner as also in the embodiment shown in FIG. 1 by means of a slot (not shown) on one side of the frame.

Located within the groove 22 is a light source, which in this case is a fluorescent lamp 21 situated in groove 22. The starters and heaters for the fluorescent lamps are not shown but are of conventional nature and are not a portion of the present invention. The sign or sheet material 10 is held up off of the fluorescent lamp by means of a shoulder 23 located at each end of the sign. The sheet material 10 is seated in the side of the frame 20 in slot 24. In addition to employing fluorescent lamps, a series of incandescent or neon-type light sources may be readily employed in the groove of the embodiment shown in FIG. 3. It should be noted that there is a similar configuration of light source located at the upper side of sheet material 10 in the upper groove 25. The electrical system employed for the embodiment of FIG. 3 could be substantially the same as that shown in FIG. 2.

FIG. 5 shows an illuminated vehicle display panel which employs sheet material divided into sections for convenience in the case of an extremely large sign or for the purpose of universal use insofar as being able to depict various indicia, for example, letters in each of the removable sections 30 mounted in frame 20. The light from light source 21 will diffuse upward through the sheet material which, in this case, is a translucent material onto which opaque letters have been impressed or printed. This arrangement will provide a glow which will cause the letters to stand out so that they are easily readable. However, there is substantially no glare or distracting light emanating from the sign itself.

FIG. 4 shows a truck trailer 28 with a large sized sign 29 according to the present invention mounted thereon with sectioned material 30 therein containing an overall billboard type message.

Modifications and adaptations of the present invention which are within the purview of the invention as described hereinbefore and in the claims are intended to be part of this invention.

What is claimed is:

1. An illuminated display sign peculiarly adapted for mounting on a side panel of a road vehicle, comprising
    a frame assembly of generally rectangular parallelepiped configuration having an elongated dimension to be disposed parallel to the longitudinal axis of a road vehicle, said frame assembly being composed of
    a pair of vertical side members disposed at opposed ends of the assembly, each side member having a slot-like groove therein adapted to receive the thickness of a sheet of glass or other display panel, said grooves being disposed to face one another and one of them extending all of the way through the side member to serve as an aperture for mounting and dismounting said display panel,
    a pair of generally horizontal top and bottom members interconnecting said side members, each top and bottom member having a slot-like groove therein adapted to receive the thickness of said display panel, said grooves also being disposed to face one another and to cooperatively register with said grooves in the side members to retain said panel, and
    rib means which may be integral with said top and bottom members extending horizontally between and interconnecting said pair of side members, said rib means having a multiplicity of horizontally spaced openings therethrough which serve to receive connecting members to secure the sign to the side of a vehicle, said rib means being of relative short vertical dimension to leave the back face of the assembly relatively open, whereby the side of the vehicle is utilized to close the back of the assembly and serves as a light reflecting surface, a translucent rectangular display panel having a message-bearing surface thereon and slidably insertable through said aperture groove into said pairs of grooves in the side members and top and bottom members to close the front face of said frame assembly, and a plurality of light sources mounted within said frame assembly to provide indirect lighting for said display panel.

2. The illuminated display sign of claim 1 in which said light sources are mounted on said side members, and which includes a reflector surrounding each said light source, each said reflector being disposed to generally direct the light emitted by its source along the elongated length of the frame assembly.

3. The illuminated display sign of claim 2 in which a number of said rib means are discrete ribs disposed between the top and bottom members.

4. The illuminated display sign of claim 1 in which said side members of the frame assembly have openings therein, said openings are closed by panels secured to the side members, said light sources are secured to said panels, and each light source is surrounded by a reflector which is also mounted on one of said panels, each said reflector being disposed to generally direct the light emitted by its source along the elongated length of the frame assembly.

5. The illuminated display sign of claim 1 in which one or both of the top and bottom members has a second and wider groove immediately underlying and connecting the panel-receiving groove, and in which one of said light sources is an elongated electric lamp received in each said second groove.

6. The illuminated display sign of claim 5 which includes a pair of shoulder support means disposed in said groove in the bottom member, said shoulder support means being disposed to support said display panel and hold it in spaced relationship to the elongated electric lamp.

7. An illuminated portable display sign for a vehicle and the like, comprising a rectangular frame assembly having a hollow box-like configuration and composed of a first vertical side member having a slot-like aperture, a second vertical side member spaced therefrom and having a slot-like groove corresponding to and facing said aperture in said first side member, a horizontal top member interconnecting said side members and having a groove interconnecting one end of the groove in said second side member with one end of the aperture in said first side member, and a bottom member also interconnecting said side members and having a groove interconnecting the other end of said groove in said second side member with the other end of said aperture in said first side member, said members including flat back surfaces and edge-securing strips adapting said rectangular frame assembly to be secured to a flat vehicle surface to define therewith a closed volume for receiving and disseminating light, a translucent rectangular panel member having a message-bearing surface and slidably insertable through said aperture in said first side member and along said grooves in said top and bottom member for seating in said groove in said second side member and for thereby closing up said box-like frame assembly, a first support means disposed at the end of said groove in said bottom member adjacent said other end of said groove in said second side member for supporting the adjacent corner of said panel member, a second support member disposed at the end of said groove in said bottom member adjacent said other end of said aperture in said first side member for supporting the adjacent corner of said panel member, a first elongate light source mounted in said groove in said top member and adjacent the perimeter of said panel member for unobstructedly projecting light across the interior of said box-like frame assembly for indirectly illuminating said message-bearing surface of said panel member and into the adjacent edge thereof for causing said panel member to radiate light from said surface thereof, and a second elongate light source mounted in said groove in said bottom member and adjacent the perimeter of said panel member for unobstructedly projecting light upward between said support means and across the interior of said box-light frame assembly for indirectly illuminating said message-bearing surface of said panel member and into the adjacent edge thereof for causing said panel member to radiate light from said surface thereof.

* * * * *